(12) United States Patent
Saffer et al.

(10) Patent No.: US 8,090,751 B2
(45) Date of Patent: Jan. 3, 2012

(54) OPERATIONAL DATA STORE

(75) Inventors: Sally Elaine Saffer, Andover, MA (US); Mario J. Broodbakker, Barneveld (NL); Raymond J. Laliberte, Derry, NH (US); John F. Reed, Jr., Nashua, NH (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1972 days.

(21) Appl. No.: 10/068,466

(22) Filed: Feb. 5, 2002

(65) Prior Publication Data

US 2003/0149702 A1 Aug. 7, 2003

(51) Int. Cl.
*G06F 17/00* (2006.01)

(52) U.S. Cl. .................................. 707/809; 707/694
(58) Field of Classification Search .................. 707/102, 707/101, 104, 6, 201, 3, 694, 809; 711/118; 395/613, 612, 614
See application file for complete search history.

(56) References Cited

U.S. PATENT DOCUMENTS

| | | | | |
|---|---|---|---|---|
| 5,553,279 | A * | 9/1996 | Goldring | 707/201 |
| 5,717,924 | A * | 2/1998 | Kawai | 1/1 |
| 5,761,706 | A * | 6/1998 | Kessler et al. | 711/118 |
| 5,978,771 | A * | 11/1999 | Vandivier, III | 705/8 |
| 6,317,803 | B1 * | 11/2001 | Rasmussen et al. | 710/107 |
| 6,757,689 | B2 * | 6/2004 | Battas et al. | 1/1 |
| 2002/0087510 | A1 * | 7/2002 | Weinberg et al. | 707/1 |

OTHER PUBLICATIONS

Inmon, W.H., "Building the Operational Data Store," Robert M. Elliott,ed. (NY: John Wiley & Sons), pp. 21-26 [as found on www.amazon.com] (1999).
Rawles, J.W., "Cluster Hardware Architecture." In *Oracle9i Real Application Clusters*, Oracle Corporation, pp. 1-6 [as found on download-west.oracle.com](Jul. 2001).
Leverenz, Lefty, et al., "Partitioned Tables and Indexes." In *Oracle8i Concepts*, Oracle Corporation, pp. I-54 [as found on technet.oracle.com] (Feb. 1999).
"Hardware Configuration." In *TruCluster Server Version 5.1*, Compaq Computer Corporation, pp. 1-14 [as found on www.tru64unix.compaq.com] (Aug. 2000).

* cited by examiner

*Primary Examiner* — Belix M Ortiz

(57) ABSTRACT

An operational data store consists of an insert table for storing new data and a history table, partitioned by range and further sub-partitioned, for storing historical data. Transfer logic periodically transfers new data from the insert table to the history table. The transfer logic includes a secondary table and fill logic for filling the secondary table with selected data from the insert table. Secondary transfer logic transfers the secondary table into the history table, such that the selected data is transferred into the history table. Indexing logic applies the history table indexing scheme to the secondary table. Table logic creates a new partition the history table, for swapping with the secondary table, by exchanging respective pointers. A query engine may apply a database query to both the history table and the insert table, so that all data is available. An aggregator accumulates new data into an aggregation buffer. The accumulated data are batched and transferred into the insert table with a single database access. A throttler throttles transactions of different classes and types independently to achieve a desired level of service. The system can be configured to execute in a plurality of processor nodes configured as a processor cluster, wherein distinct database server instances are associated with distinct processor nodes of the processor cluster.

42 Claims, 17 Drawing Sheets

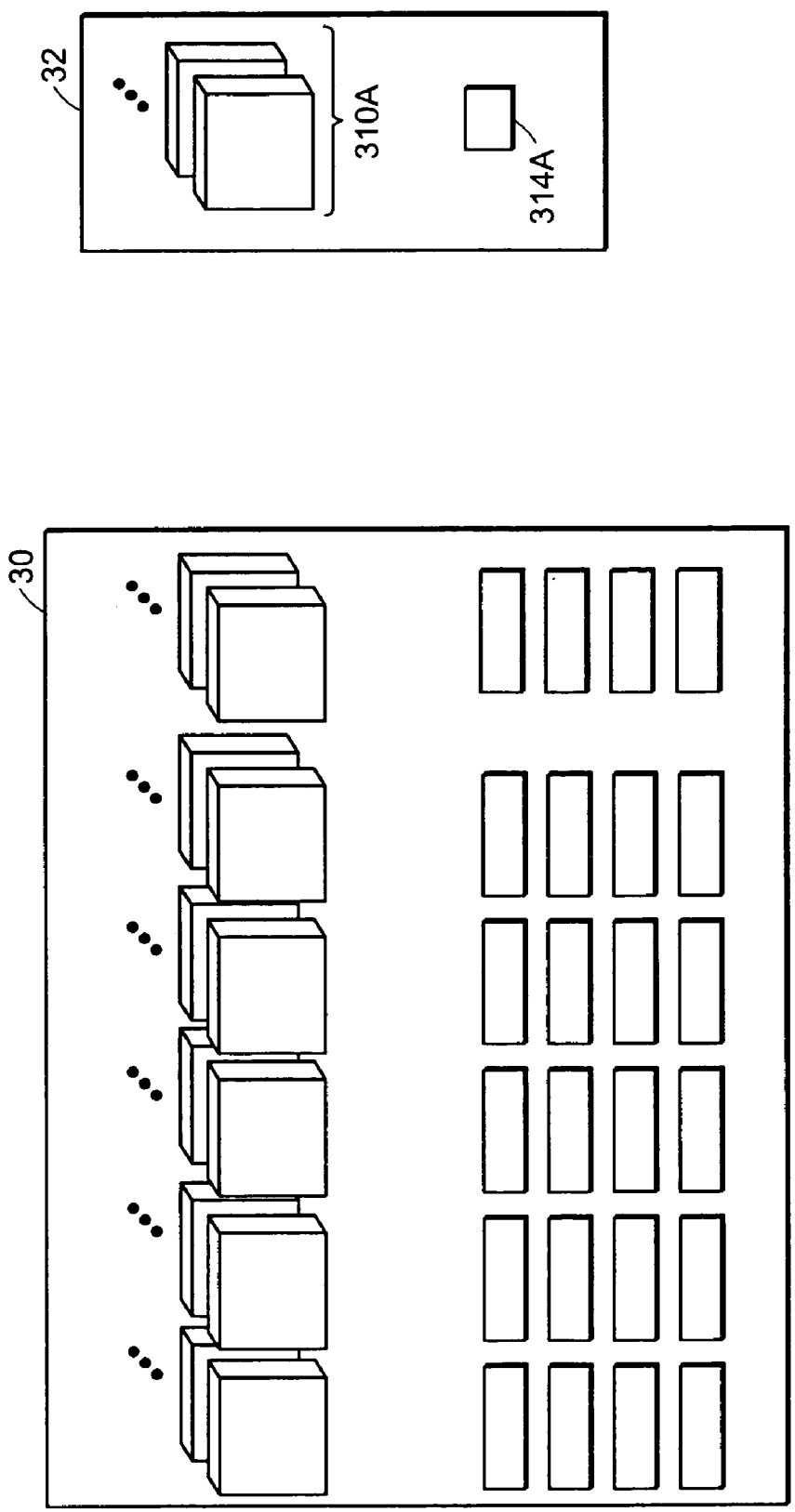

OPERATIONAL DATA STORE

BACKGROUND

In today's electronic commerce markets, exchange of information between vendors and customers must occur in real-time. Vendors need to be able to track the actions and reactions of their potential customers to be able to make decisions as to what products will best suit the customer's needs or interests. For example, as a customer peruses an e-retail website, if the vendor can determine what type of products the customer is looking at, similar products can be quickly displayed on the screen as an additional offer to the customer. All of this must typically happen before the customer logs off from the website, or the vendor's solicitation opportunity will be lost.

"An Operational Data Store (ODS) is an architectural construct that is subject oriented, integrated (i.e., collectively integrated), volatile, current valued, and contains detailed corporate data." W. H. Inmon, *Building the Operational Data Store*, second edition, pp. 12-13, John Wiley & Sons, Inc., 1999.

A zero-latency enterprise (ZLE) ODS is a collection of data, the primary purpose of which is to support the time-critical information requirements of the operational functions of an organization. A ZLE ODS is maintained in a state of currency with transaction systems and may be made available for any person who requires access.

The role of any ODS is to provide an environment tuned to information delivery, by containing data at the transaction detail level, coordinated across all relevant source systems, and maintained in a current state.

An ODS presents a convergent/consolidated view of Decision Support System (DSS) and On-Line Transaction Processing (OLTP) operational data on the same sets of tables. This integration transforms operational data, which is application- and clerical-centric, into subject-oriented data containing detailed events on the same sets of tables resulting in an integrated up-to-date view of the business.

To function at the high level of expectation required of a ZLE ODS, detailed event knowledge must be stored. For example, individual transactions such as call detail records, point of sale purchases, Automatic Teller Machine (ATM) transactions, and pay per view purchases are stored at the line item level. Web-based interactions may be stored to enable monitoring of click stream activity, offers extended and results of the offers.

At least one database manufacturer (Oracle Corporation) allows partitioning of tables, in which a table is decomposed into smaller and more manageable pieces called "partitions." Once partitions are defined, SQL statements can access and manipulate the partitions rather than entire tables or indexes. Partitions may further be subdivided into sub-partitions.

SUMMARY

The present invention is an operational data store (ODS) in which customer information can be easily recorded and easily searched. Decisions can be made almost instantaneously. It would be desirable to insert custom records into the ODS at a very high rate of speed, while the very same records should be able to be queried immediately to help make decisions that affect interactions with a customer.

An ODS that maintains a high level of performance according to an embodiment of the present invention uses Oracle Enterprise Server™ with the Oracle Parallel Server™ option. This technology uses table sub-partitioning, allowing the functional partitioning of tables such that individual partitions of a table can have different block storage formats and indexing techniques.

To operate a hybrid ODS, such that high-speed insert information combined with the historical information is immediately available to OLTP and DSS queries, an embodiment of the present invention employs a composite-partitioned historical data table, partitioned by range, and then sub-partitioned, and having multiple indexes. This table is particularly designed for fast access to data records.

High-speed insert records are inserted into an "insert" table that has the same characteristics of the sub-partitions of the historical data table, but which is designed instead to enable the fast insertion of records.

Embodiments of the present invention may be implemented on Compaq Computer, Inc.'s™ TruCluster™ platform, using existing database technology native to the platform, such as Oracle Corporation's™ database products. The TruCluster environment provides reliability and performance. The integration of the Oracle database may employ the Oracle Parallel Server™ technology to achieve performance through load balancing, as well as through the partition of transaction classes across nodes. This reduces access conflicts, and assists in throttling. In addition, transactions may be routed across nodes of the cluster, to provide graceful degradation of performance in cases of node failures on the cluster.

In accordance with an aspect of the invention, an operational data store can include an insert table for storing new data and a history table for storing historical data. Transfer logic can periodically transfer new data from the insert table to the history table. Data from the insert table may be transferred to the history table at regular intervals which are configurable. The intervals may be different for different tables.

The history table may be partitioned, for example by range, and each partition may be further sub-partitioned into a number of sub-partitions, such as equal to the number of database server instances. Each sub-partition of a partition may further be associated with a database server instance, thus helping to separate the workload.

The transfer logic may include a secondary table and fill logic for filling the secondary table with selected data from the insert table. Secondary transfer logic can transfer the secondary table into the history table, such that the selected data is transferred into the history table.

Indexing logic can apply the history table indexing scheme to the secondary table.

The secondary transfer logic may further include table logic that creates a new partition of the history table, for swapping with the secondary table. That swapping can occur by exchanging respective pointers.

A query engine may apply a database query to both the history table and the insert table, so that all data is available.

An aggregator may accumulate new data in an aggregation buffer. The data may then be batched and transferred into the insert table with a single database access. When to transfer batched data may be triggered by the crossing of various thresholds, such as when a batch surpasses a maximum size, for example as measured in number of bytes or number of records, or at regular intervals. Any of these thresholds or intervals may be configurable.

A throttler may throttle transactions of different classes independently to achieve a desired level of service. For example, if inserts and queries are two classes, the throttler may throttle queries so that inserts can be executed at at least the desired level of service. Transaction classes may comprise plural types. Throttling may also be dependent on transaction type, and may occur independently for different types.

The present system may be configured to execute in a plurality of processor nodes configured as a processor cluster, wherein distinct database server instances are associated with distinct processor nodes of the processor cluster.

BRIEF DESCRIPTION OF THE DRAWINGS

The foregoing and other objects, features and advantages of the invention will be apparent from the following more particular description of particular embodiments of the invention, as illustrated in the accompanying drawings in which like reference characters refer to the same parts throughout the different views. The drawings are not necessarily to scale, emphasis instead being placed upon illustrating the principles of the invention.

FIGS. 8A-8I are schematic diagrams that illustrate the process described in FIG. 7.

DETAILED DESCRIPTION OF THE INVENTION

Figure 1:
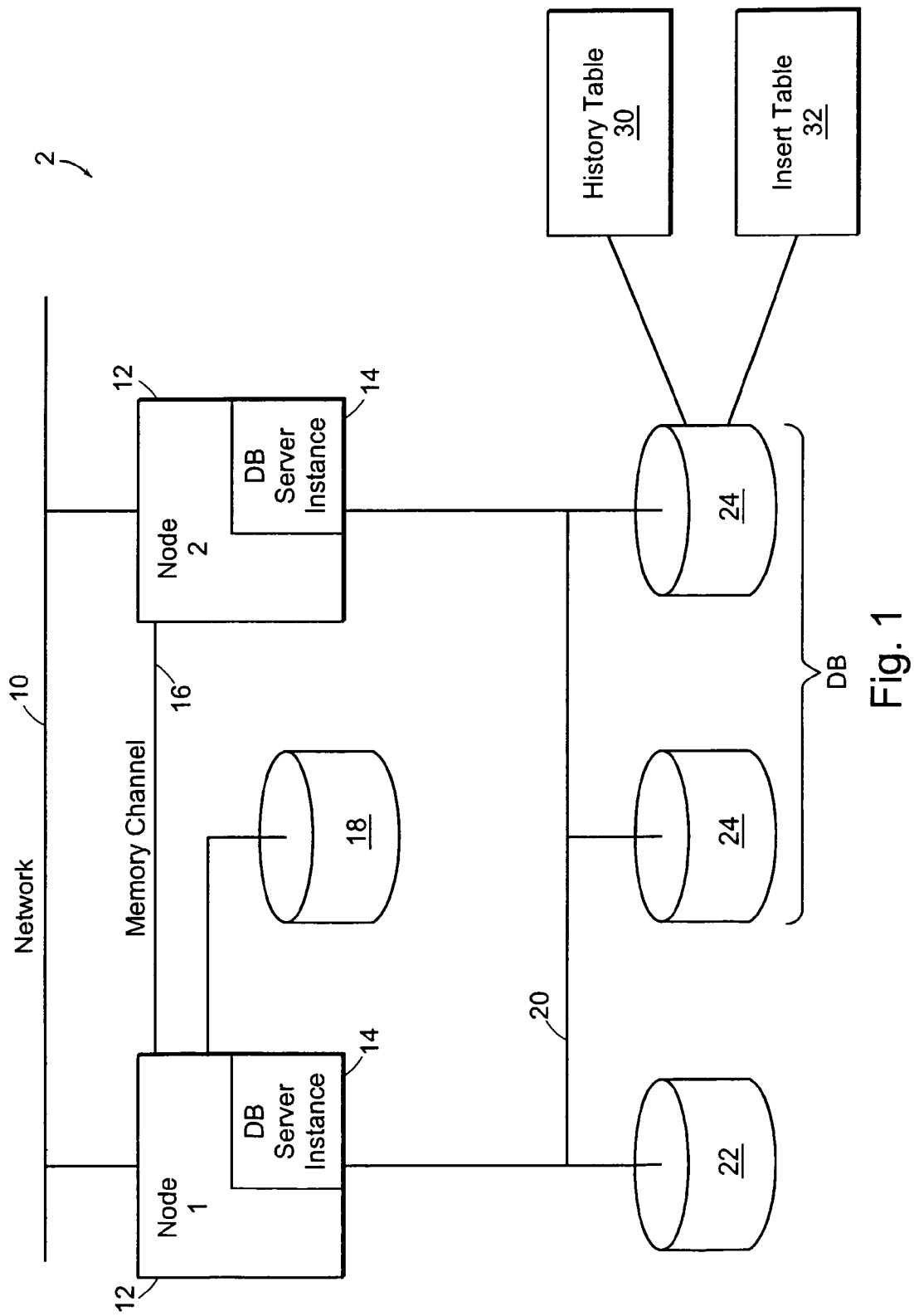
FIG. 1 is a schematic diagram illustrating a two-node cluster for producing particular embodiments of the invention.

FIG. 1 is a schematic diagram illustrating a two node cluster 2. Each node 12 may be connected to a network 10. Furthermore, each node 12, may comprise one or more processors. In the configuration shown, the two nodes 12 are interconnected via a memory channel 16. Here, Node 1 has its own private disk storage 18, but more typically, most storage 22, 24 is connected via a common bus 20 to all of the nodes 12.

In an embodiment of the present invention, each node 12 may execute an instance of a database server 14.

In the configuration shown, disk drive 22 may, for example, hold the operating system and other software. Other disk drives 24 comprise a database, such as an operational database.

To achieve high-throughput of record insertions into the database 24 while simultaneously allowing queries into the database, the database 24 includes a high-speed insert table 32 and a history table 30. New records are inserted into the insert table 32 whose architecture is designed for high-speed inserts. At certain intervals, this data is transferred to a slower but better indexed history (historical) table 30.

The Wrapper Application Architecture

In an embodiment of the present invention, a "wrapper" application encapsulates as much as possible of the configuration and tuning requirements of the database.

The wrapper application preferably integrates easily with CORBA, J2EE, and messaging technologies. Because integration technologies are usually customer-specific, the integration of the wrapper must also be easily extensible.

Figure 2:
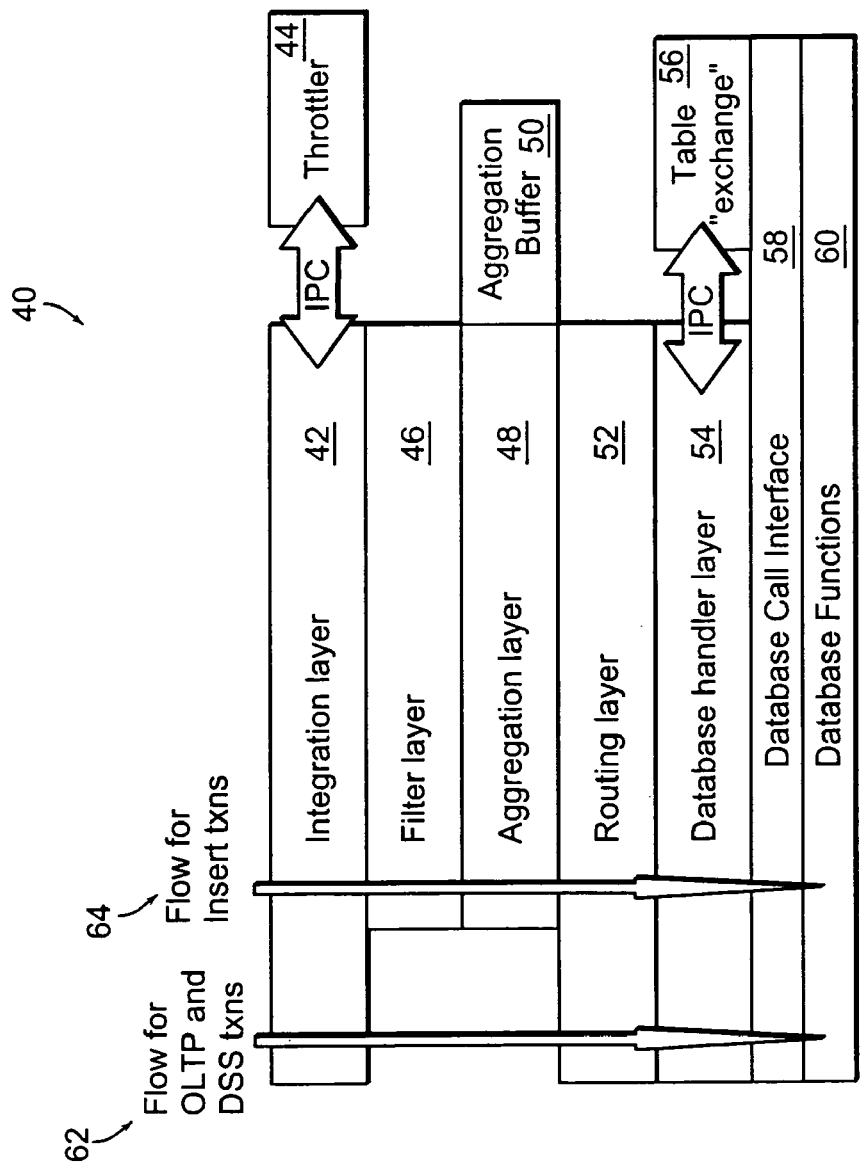
FIG. 2 is a schematic diagram illustrating the layers of the wrapper architecture of an embodiment of the present invention.

FIG. 2 is a schematic diagram illustrating the layers of the wrapper application 40 of an embodiment of the present invention.

At the highest level is the integration layer 42. The integration layer 42 receives update messages and determines the class of each update. This layer 42 also performs throttling. A throttler 44 may throttle transactions of different classes, depending on current conditions.

The filter layer 46 determines whether the data is acceptable for insertion into the table 32. The aggregation layer 48 batches records together, in the aggregation buffer 50, for batched inserts.

The router layer 52 routes transactions to the appropriate server.

The database handler layer 54 sends transactions to the database. A table exchange process 56 at this layer from time to time moves data from the insert table 32 to the historical data table 30 by exchanging pointers to partitions and subpartitions of the two tables 30, 32 to sustain a high transaction insert rate.

The database call interface 58 such as the Oracle Call Interface, is the communications interface to the database. Finally, the database functions 60 are functions which are intrinsic to the database. The database call interface 58 and database functions 60 are not part of the wrapper application 40, but are shown for completeness.

As shown in FIG. 2, insert transactions flow through all of the layers, as indicated by arrow 64. On the other hand, OLTP and DSS transactions, as indicated by arrow 62, bypass the filter and aggregation layers 46, 48. Note that OLTP and other query transactions are "routed" via the routing layer 52 directly to the database handler layer 54. There is no need to filter and aggregate these transactions, as they cannot function as aggregated processing. However, they can be affected by the throttler 44 if appropriate.

Figure 3A:
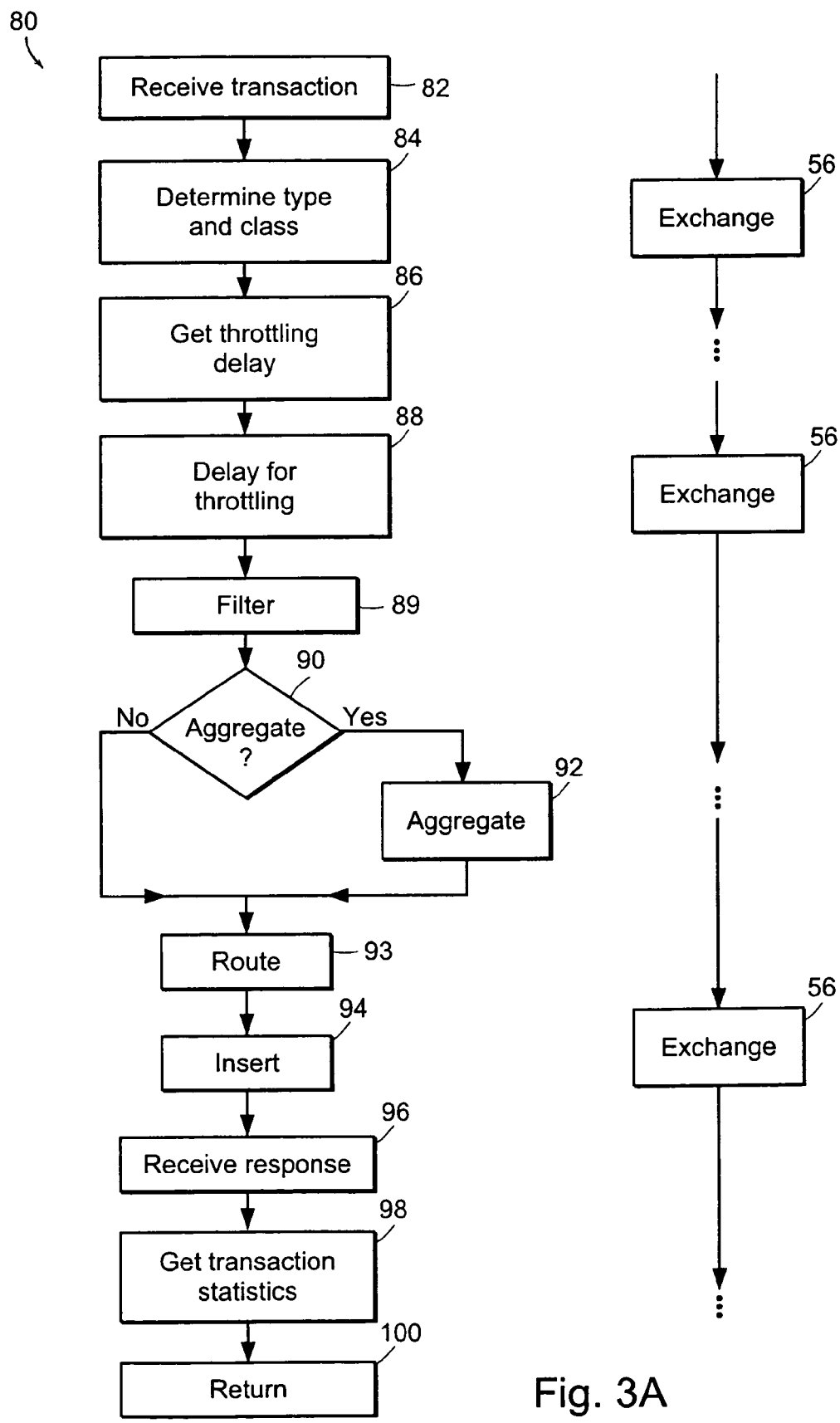
FIG. 3A is a flow diagram illustrating the operation of the integration, filter, aggregation, routing and database handler layers of FIG. 2.

FIG. 3A is a flow diagram 80 illustrating the operation of the integration, filter, aggregation, routing and database handler layers, respectively 42, 46, 48, 52 and 54, of FIG. 2.

In step 82, various transactions are received. The type and class of each transaction is determined at step 84. A delay is determined in step 86 based in part on the type and/or class of the transaction. The determined delay is applied in step 88.

At step 89, transactions are filtered according to "filter rules." Any transactions which are blocked by the filter are rolled back.

Next, a decision is made at step 90 as whether to aggregate transactions. If so, they are accumulated in an aggregation buffer (step 92).

All transactions, aggregated or not, are routed to the proper node (step 93), and inserted (step 94) into the insert table 32 (FIG. 1) of the ODS.

After applying the new transactions to the database, a response from the database is received at step 96. Transaction statistics are then collected at step 98, to be used by the throttler 44 in determining a throttling delay. Finally, the process ends at step 100.

In parallel with steps 82 through 100, the insert table is periodically exchanged into the historical table 30 (FIG. 1) by an exchange process 56, describe more fully below.

Figure 3B:
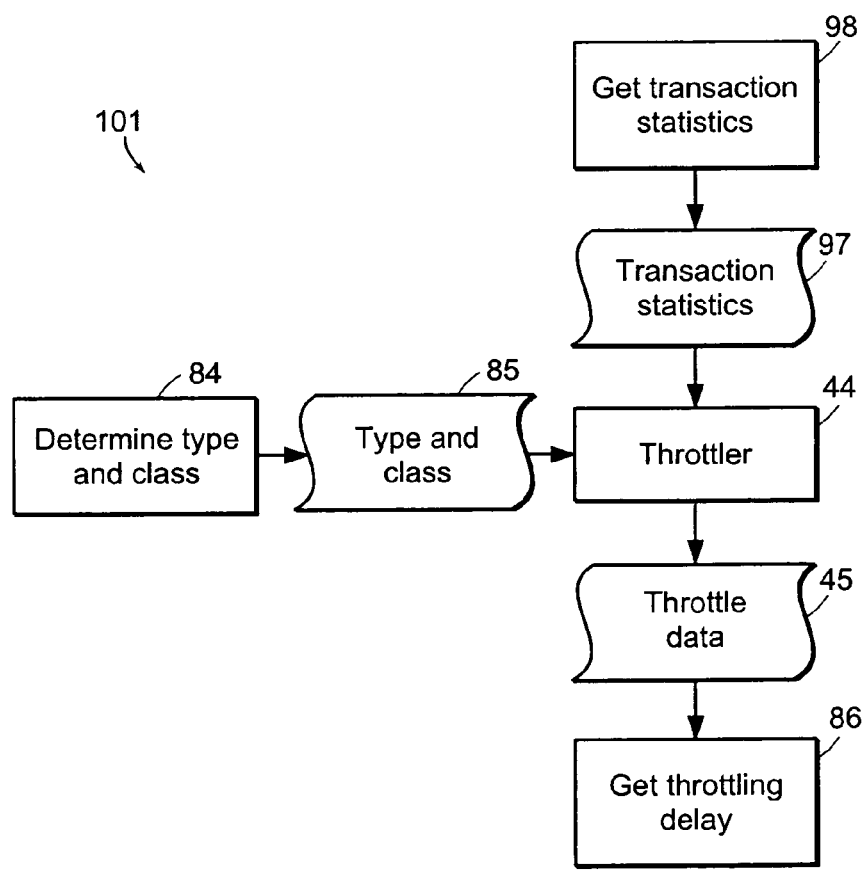
FIG. 3B is a block diagram illustrating the information passed to and from the throttler.

FIG. 3B is a block diagram 101 illustrating the information passed to and from the throttler 44. The statistics 97 collected in step 98 are passed to the throttler 44. Similarly, step 84, which determines the type and/or class of a transaction, passes this type/class information 85 to the throttler 44. The throttler 44 determines throttle delay data 45, based on the statistics 97 and type/class information 85. This throttle delay data 45 specifies whether and for how long to delay a transaction, and is passed to step 86.

Figure 4:
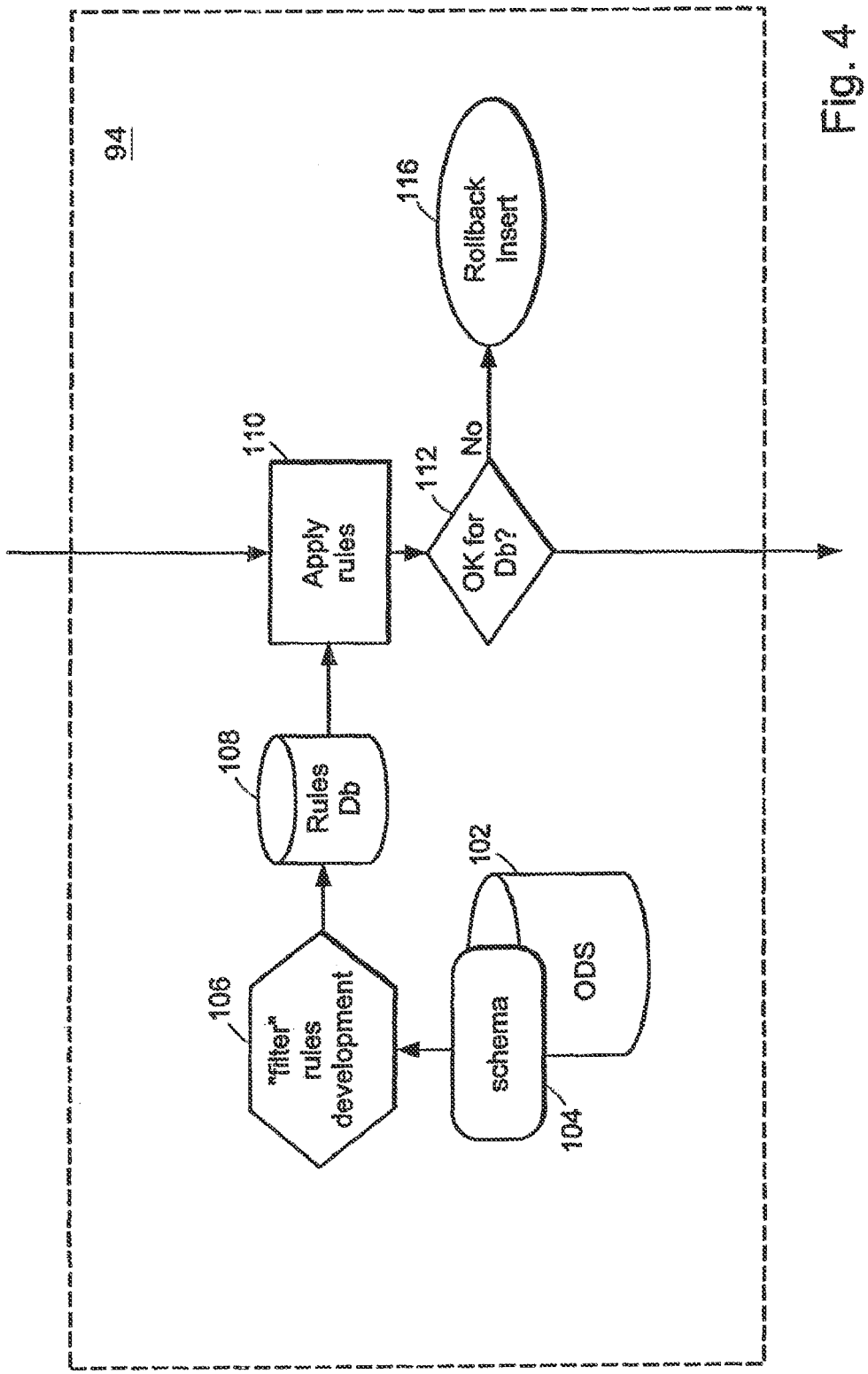
FIG. 4 is a flow diagram illustrating further details of the filter step of FIG. 3A.

FIG. 4 is a flow diagram illustrating further details of the filter step 94 of FIG. 3A. At 106, filter rules are developed according to the ODS 102 and its schema 104. The rules generated may be stored in a rules database 108. These rules are then applied, in step 110, to incoming transactions that are targeted for the high-speed insert table. Transactions that pass the filter rules at step 112, are then evaluated for aggregation at step 90 (FIG. 3A). If, on the other hand, a transaction is rejected by the filter, then the transaction is rolled back (step 116).

Figure 5:
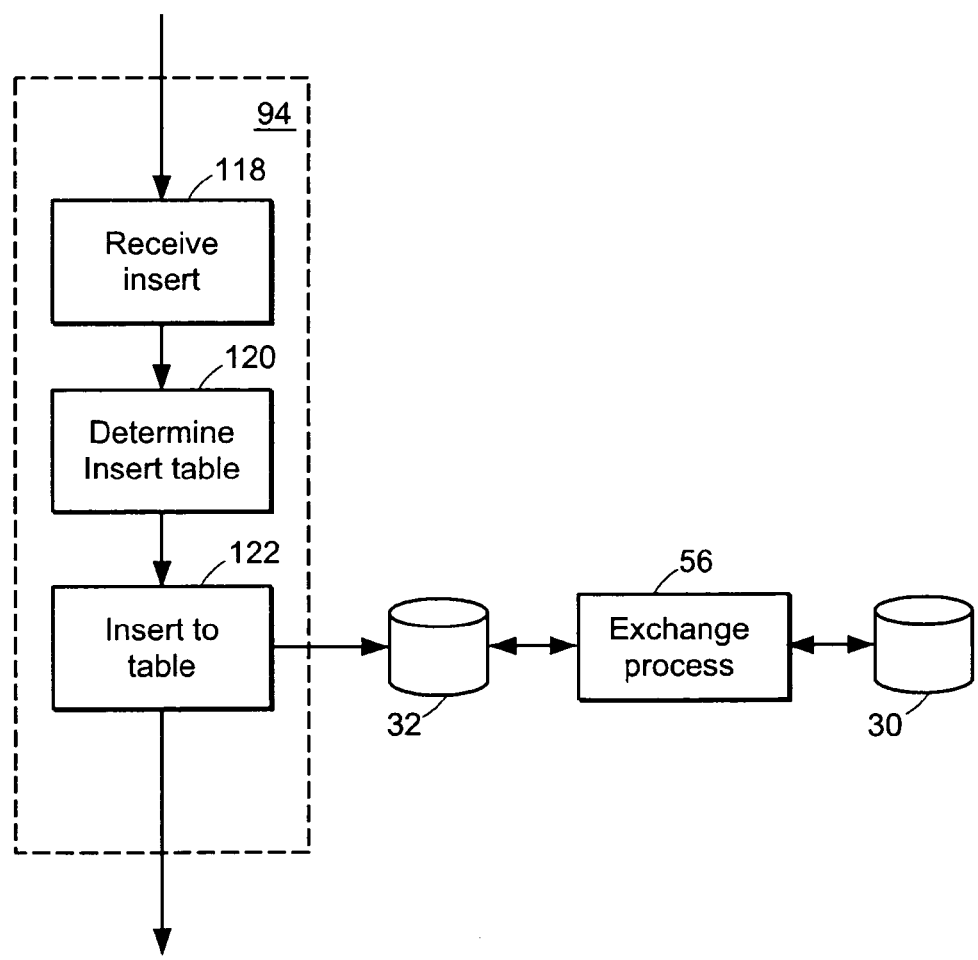
FIG. 5 is a flow diagram corresponding to the insert block of FIG. 3A.

FIG. 5 is a flow diagram corresponding to the insert step 94 of FIG. 3A.

In particular, once insert transactions are received in step 118, step 120 searches an informational table in the database that contains the names of the available high-speed insert tables. Based on the content of the SQL statement that is performing the high-speed insert, the appropriate table can be determined. The original SQL statement containing the record to be inserted is then "tagged" with the new high-speed insert table name. Transparent to the user, the record is routed into the high-speed insert table that has been created with an association to the final historical table destination, into which the record will eventually be placed during the exchange process.

At step 122, the insert data is inserted into the insert table 32. The exchange process 56, described below with respect to FIGS. 8A-8I, periodically moves data from the high-speed insert table 32 to the history table 30.

Briefly, the present invention uses a combination of a partitioned "history" table for query response and an "insert" table that receives the batch transaction inputs. These tables collectively represent a single business-level table—that is, a single normalized object such as a purchase order header. The performance of the inserts is dependent on an "exchange" or "swap" process, where the insert table is added as a partition to the query table.

A discussion of each of the layers of FIG. 2 follows.

Integration Layer

The integration layer determines the class of each transaction received, e.g., read, insert, OLTP, etc.

To achieve a desired level of service, different "classes" of transactions may be independently throttled. That is, to provide the desired performance of the high-speed inserts, queries may need to be slowed, so that the higher-priority insert transactions can execute at full speed.

To achieve a desired level of service, the different classes of transactions may be independently throttled. Throttling may occur dynamically as the need arises, according to different classes of transactions and associated priorities.

In a "mixed workload" environment, e.g., one which includes a mixture of archiving, OLTP and DSS queries, high-speed inserts, backup processes and extract/translate/load (ETL) transactions, the rate of transactions by class is determined by the usage of the ODS and the business process it supports. As the system becomes loaded it may become necessary to throttle transactions by class in order to provide responsiveness to critical transactions at the possible expense of non-critical transactions.

Throttling may be set according to both transaction class and type. "Class" refers to the major categories of interaction with the database, e.g., inserts, OLTP, or queries. "Type" refers to a specific business transaction, for example, a sales order insert. The "class" designation may be mandatory for all transactions, while the type designation may be optional. In cases where the type definition is not supplied, the class designation alone may determine the throttling parameters.

Where the type of a transaction is defined, the type may define the throttling for the transaction. Where the type is not defined, the class, determines the throttling. Throttling may be based on a minimum level performance (MLP) and a priority. The MLP determines the minimum transaction rate for a given transaction type and class. The priority determines which transactions are throttled.

The throttler 44 attempts to keep all transactions moving and does not intervene unless a lower-priority process is causing degradation in the processing of higher-priority processes. When such degradation is detected, the throttler 44 attempts to deliberately degrade the demand of the lower-priority processing in order to sustain at least an MLP for the higher priority processes. The MLP serves as a baseline for proportioning the processing, as well as a "floor" below which processing performance should not fall for any transaction.

The throttler 44 may also log changes for the process that required intervention, based on configuration and dynamic selection.

Throttling is based on the current rate of transactions and the average transaction response time by class and/or type of transaction. These are compared against desired response times and priorities. The transaction class priority may then order the effort to bring actual response time within the range of desired response times. The top class priority may be "mandatory," while other classes accept some degree of delay if necessary to satisfy a higher priority. In one embodiment, a range of delay may be set that would be acceptable for each class of transaction. A more complete solution would be to set this range for every business type of transaction within major technical classes.

The class and type of a transaction may be determined from the message contents. Data 45 required for throttling is obtained and then sent to the throttler 44. The delay is then inserted into the processing stream throttling back the transaction processing if necessary (steps 86 and 88 of FIG. 3A).

On completion of the transaction, transaction statistics may be updated (step 98). Such statistics may include, but are not limited to: the level of inserts per second; query response times for the different classes and types of queries in a mixed workload environment; available CPU resources; and the number of clients over a given period.

On a periodic basis, the transaction statistics may be transferred to the throttler 44 via interprocess communications (IPC). The transaction statistics and the transaction delay may be stored in a common repository that spans all nodes of a cluster.

Filter Layer

The filter layer 46 determines whether the data is of the correct form to be inserted into a table and checks the data against database semantics. This layer "pre-determines" whether the data will in fact load successfully into the database without error.

The filter layer loads the database schema into a memory buffer, for example, a shared memory area, to provide a "test base" for the data. Loading the schema occurs when the filter is invoked. The database is assumed to be schema-locked during execution of the filter. That is, the characteristics of the history table, into which data is being copied, cannot be changed during the filter process.

Insert transactions that fail the filter go no further. On the other hand, a successful pass of the filter would "commit" an insert transaction.

The filter layer 46 examines insert transaction data to ensure it will inject into the database without error.

The filter is best suited to a rules engine, on one level, and to a data transformation engine, on another. The problem is one of efficiency and whatever filtration is applied must be high-performance and done in-memory. The optimum situation is that the insert table 32 have minimal constraints on data inserts and that any business filtration occur external to the ODS wrapper. Thus, filtration within the wrapper is essentially for checking data semantics and type, e.g., strings of a certain length, integers, and so on.

Aggregation Layer

The aggregation layer 48 accumulates insert records together for batched inserts, with a single database access, using "count" and/or "time" thresholds to determine the batch size. Count thresholds may be based on the insert record size, or the number of records or the data size. While batch size may be configurable, the batch size tested was 100 records of 60 bytes each.

High-speed database inserts, called "fait accompli" transactions, are inserted into insert tables 32 having a minimal number of indices, e.g., just one index. These insert tables are moved into history tables 30 at regular intervals. Additional indices are then built for the new "historical" data. While an acceptable interval depends on the particular application, the interval chosen in our test environment was 10 minutes.

Because inserts may involve more than one database table, the aggregator is responsible for packaging the aggregated transactions into update units that keep the database in a consistent state. In other words, the aggregate thresholds depend on each other in case of multiple table updates.

The thresholds depend on each other in that if multiple tables are being inserted into, it may not be appropriate for one table to be inserted into based on a time quantum while another, related table is being inserted into based on a size quantum or a different time quantum. Otherwise, it would be possible for some records to be inserted into one table (time quantum) with a significant time lag occurring until the related records are inserted into the second table (size quantum or different time quantum). Therefore, thresholds may have a dependency on each other in order to maintain the database in a consistent state.

Thus, the aggregation algorithm must be aware of any relationships that may exist between the insert tables. It may also mean that transactions to the routing layer 52 may involve more than one aggregate table.

The aggregation buffer 50 is a data structure that holds the aggregated inserts until their number reaches a threshold, at which time they may then be inserted into the database. This buffer 50 may be located in memory that is protected from failure. The aggregation buffer 50 need not hold the transactions in aggregated form. The aggregation buffer may be persistent and should operate at high speed, or the advantages of aggregation will be lost.

In some instances, a sourcing client may provide insert transactions in batches. In such cases, the responsibility for controlling the batches reverts to the sourcing client.

Figure 6:
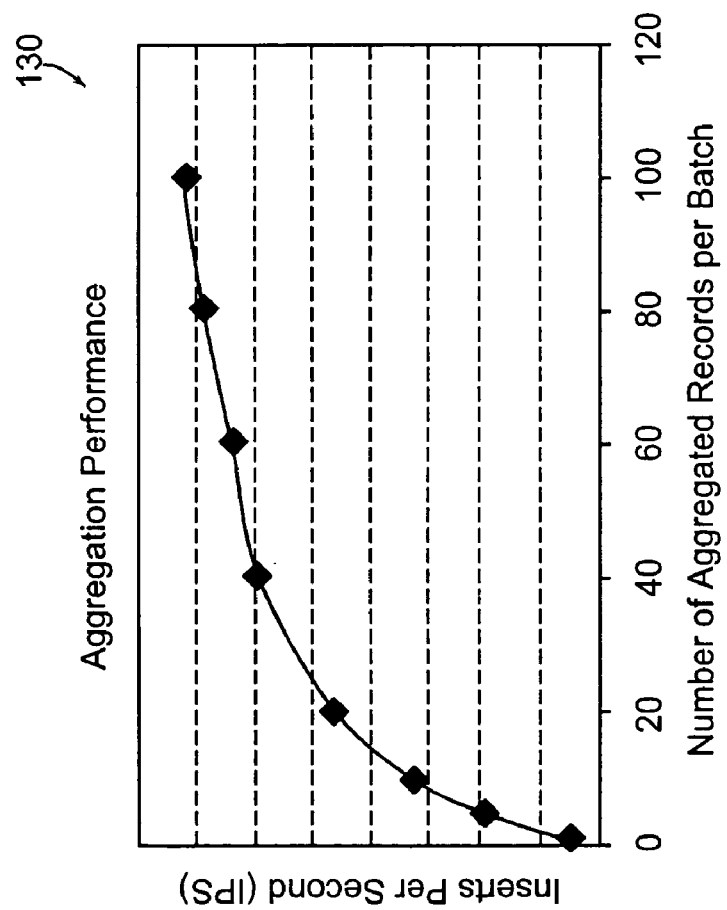
FIG. 6 is a graph that provides information on the use of committing aggregated batches of records as compared to inserting records one at a time.

FIG. 6 is a graph 130 that provides information on the use of committing aggregated batches of records as compared to inserting of records one at a time. The figure shows that performance is greatly improved by committing larger aggregated batches of records for updates.

One difficulty in this process is maintaining the aggregation store and processing the aggregated records after a failover. Writing the aggregated records to persistent store may be so time-consuming that the value of aggregation as a performance enhancement could be lost. One solution is to use persistent aggregation that makes use of memory, solid-state disk, or other very low latency storage. It is important to design the aggregation storage as a security backup that is never read unless there is a failover.

Aggregation is controlled by "count" and "time" thresholds. These represent the maximum number of records aggregated into a batch, and the maximum time between aggregate update to the database, respectively. In cases of multiple insert record types the count and time quanta parameters must be established for each type. The thresholds may be configurable.

Aggregation may also be controlled by the size of the aggregate buffer. In cases of transactional inserts to multiple tables, if supported, aggregation triggering may depend on the relationships between tables.

The thresholds may be adjustable via a rules engine, which may be a shared function with the filtering layer. This would allow the combination of the filtering rules with aggregation rules, indicating what aggregates need to be combined, and possibly the optimum aggregate size.

Routing Layer

The routing layer 52 receives transactions from the aggregation layer and from the integration layer. The transactions from the aggregation layer 48 are batches of insert-class records, while OLTP and DSS transactions are received from the integration layer. These are then routed to the proper node.

Database Handler Layer

The database handler layer 54 processes the transaction to send to the database and then executes it through the database call interface layer. It also communicates results through the router layer to the integration layer. The database handler layer 54 is responsible for transactional integrity of the database calls being communicated back to the integration layer 42, or in the case of aggregated inserts, the aggregation layer 48.

This layer is responsible for database access, and for managing the insert tables and the "exchange" process 56 for updating the historical table 30. To do this, the handler maintains a data item that signals the halt of inserts and the start of the exchange process 56. This process is conducted in parallel with the continuation of inserts if all insert processes for a specific table (or set of tables) are "pointed" to a new insert table or partition at the same time.

An independent process monitors the number of inserts to the tables, again through an IPC, and then decides when an insert table must be "exchanged" into the historical data table 30. It then signals an independent process that the insert table is ready for "exchange".

The exchange process 56 rolls the insert table 32 into the history table 30 and empties the most recently exchanged partition of the insert table 32. It then enables the insert table to accept inserts.

The insert processes update an inter-process communication (IPC) element to indicate how many inserts in the table they are addressing.

The thresholds for the exchange process and for aggregation are unrelated. Tuning of the "exchange" timing is required to optimize the database processes. The exchange process 56, which is managed by the database handler layer 54, uses CPU resources heavily. Thus, timing the exchanges to minimize the visibility of the demand can optimize the mean performance of the ODS. The exchange timing algorithm may take into account the current demand on the ODS, as seen at the front end. Therefore, the database handler needs to also have access to "see" the transaction throttling data.

To avoid data block locking contention during the real-time, high-speed inserts into the database, while the DSS queries are running, a single range-partitioned insert table 32 is used to hold the real-time records. In one embodiment, the range used for the partitioning is {instance_id, date}, thereby creating one partition per instance/date(range) combination.

At a given interval, the real-time data is reclassified as historical data. To accomplish this, each of the real-time partitions of the insert table 32 is exchanged with a single sub-partition of the historical table 30.

Figure 7:
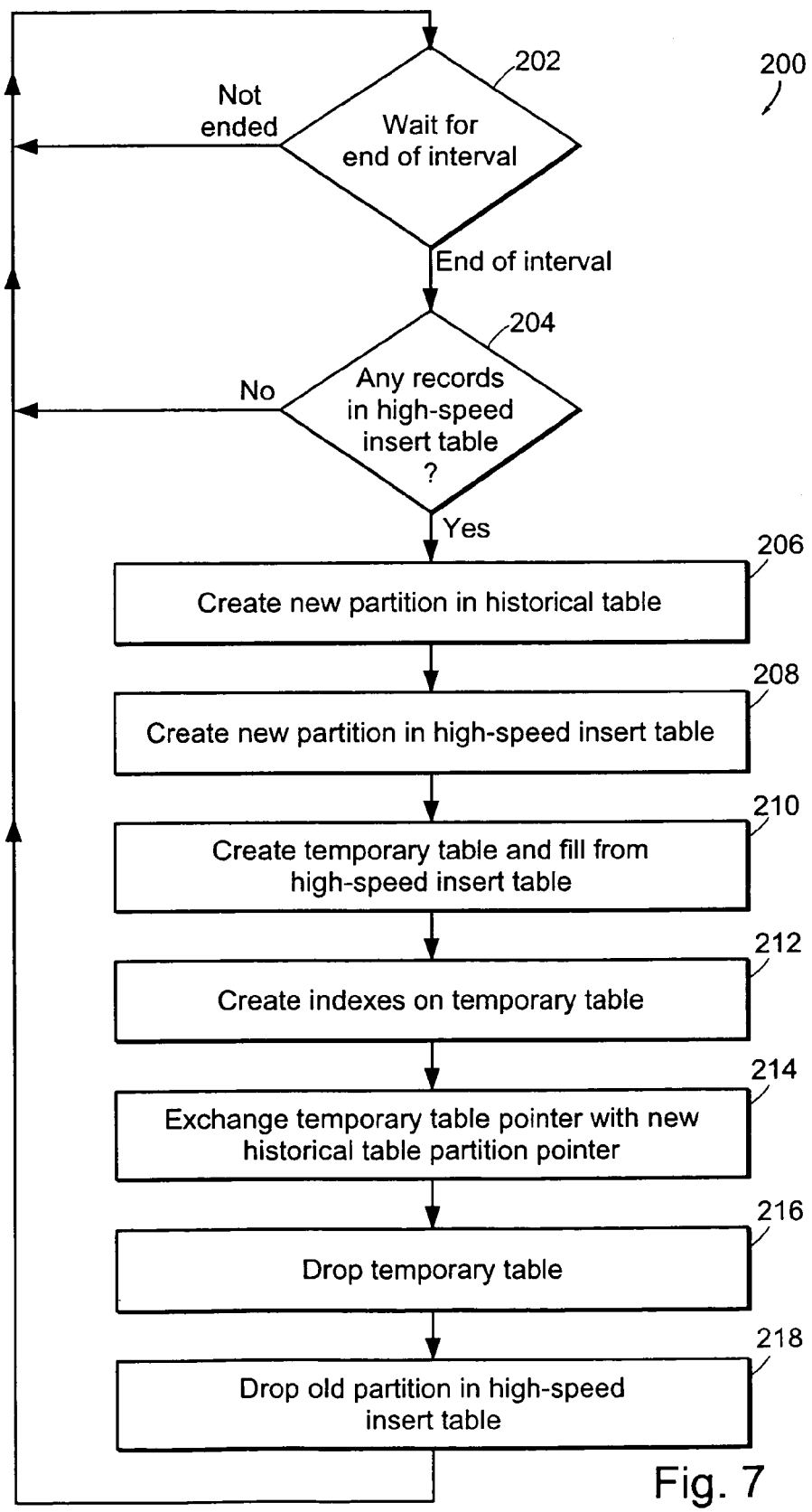
FIG. 7 is a flow chart illustrating a particular table exchange process.

FIG. 7 is a flow chart 200 illustrating operation of the table exchange process 56.

At step 202, the process waits for the end of some predetermined interval, looping until the end of the interval is reached. At the end of the interval, at step 204, the insert table is examined to determine whether any records need to be moved from any one of the partitions of the high-speed insert table 32. If not, then execution returns to the wait loop at step 202.

On the other hand, if there are records in the insert table, then execution proceeds to step 206. In step 206, a new partition is created in the historical table, partitioned by range and sub-partitioned by the number of database server instances. In step 208, a new partition is created in the high-speed insert table, based on the values in the latest existing partition, and high-speed inserts are now routed to this new partition.

At step 210, a temporary table, partitioned by instance id, is created at the desired destination location for the next historical data table extension. This location is chosen for optimal load balancing performance, such that each partition is created in a separate tablespace in a separate datafile, so that the data block locks per partition, e.g., per instance, can be controlled. This temporary table is filled with data from the high speed insert table 32. This can be done, for example, by using a "select * from [the insert table]" clause with the "create table" statement.

At step 212, multiple indexes are created on the temporary table, based on the predicted DSS use of the records. Thus, indexes will match the indexing schemed in the history table.

At step 214, the temporary table is exchanged with the new partition, by exchanging only the metadata pointer values. Thus, no data is moved. The pointer to the temporary now becomes the pointer to the new partition in the history table 30 at the desired destination location.

In step 216, the temporary table is dropped. Finally, the old partition in the insert table is dropped at step 218.

In this manner, data from the insert table is transferred into the historical table at relatively low cost. At this point the process repeats, waiting for the end of the next interval at step 202.

Figure 8A:
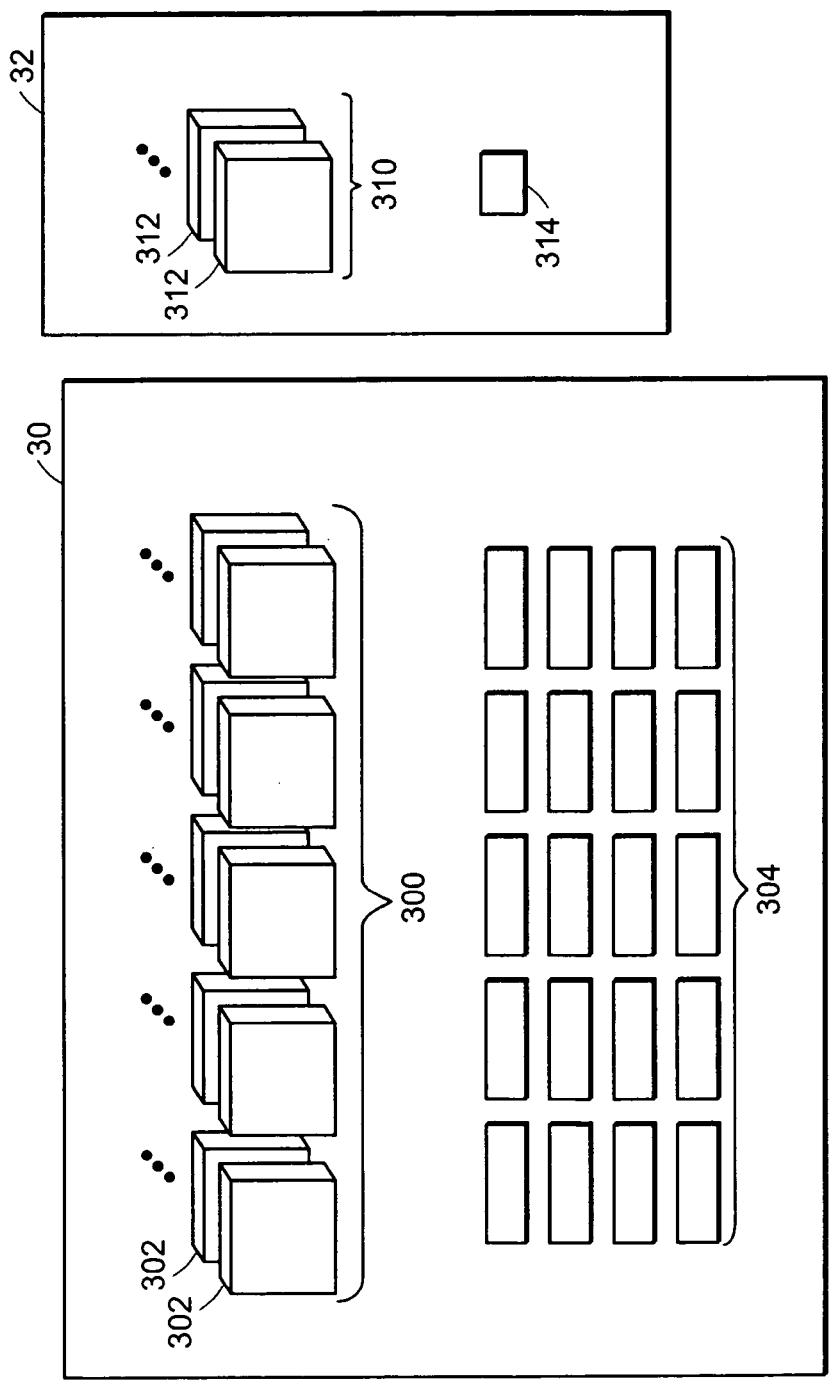

FIGS. 8A-8I further illustrate the process described in FIG. 7. FIG. 8A shows the state of the tables before the next change is performed.

The historical table 30 may be partitioned into one or more partitions 300. Each partition in turn may be sub-partitioned into sub-partitions 302. In at least one embodiment, the number of sub-partitions 302 for each partition 300 is equal to the number of database server instances. Multiple indices 304 are created for each partition.

The high speed insert table 32, into which new data is inserted, comprises a table 310, which is partitioned into one or more partitions 312. The number of partitions 312 will generally coincide with the number of sub-partitions 302 within the historical database 30. As discussed earlier, the insert table 32 has a single index 314. Note that there may be more than one insert table, although only one is shown.

Figure 8B:
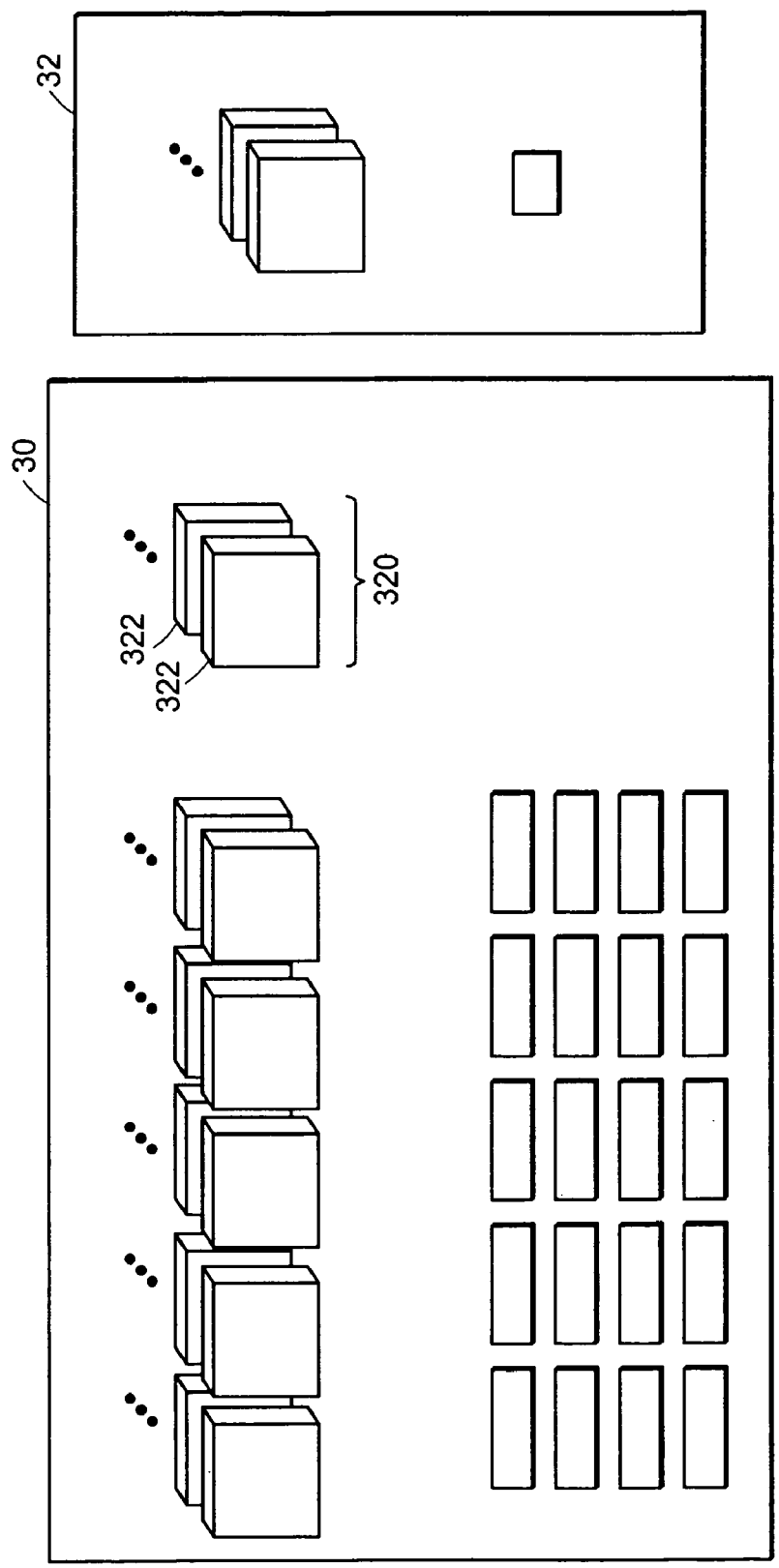

FIG. 8B illustrates step 206 of FIG. 7. A new partition 320 is created in the historical database 30. This new partition 320 may be sub-partitioned into sub-partitions 322, similar to the other partitions within the historical table 30.

Figure 8C:
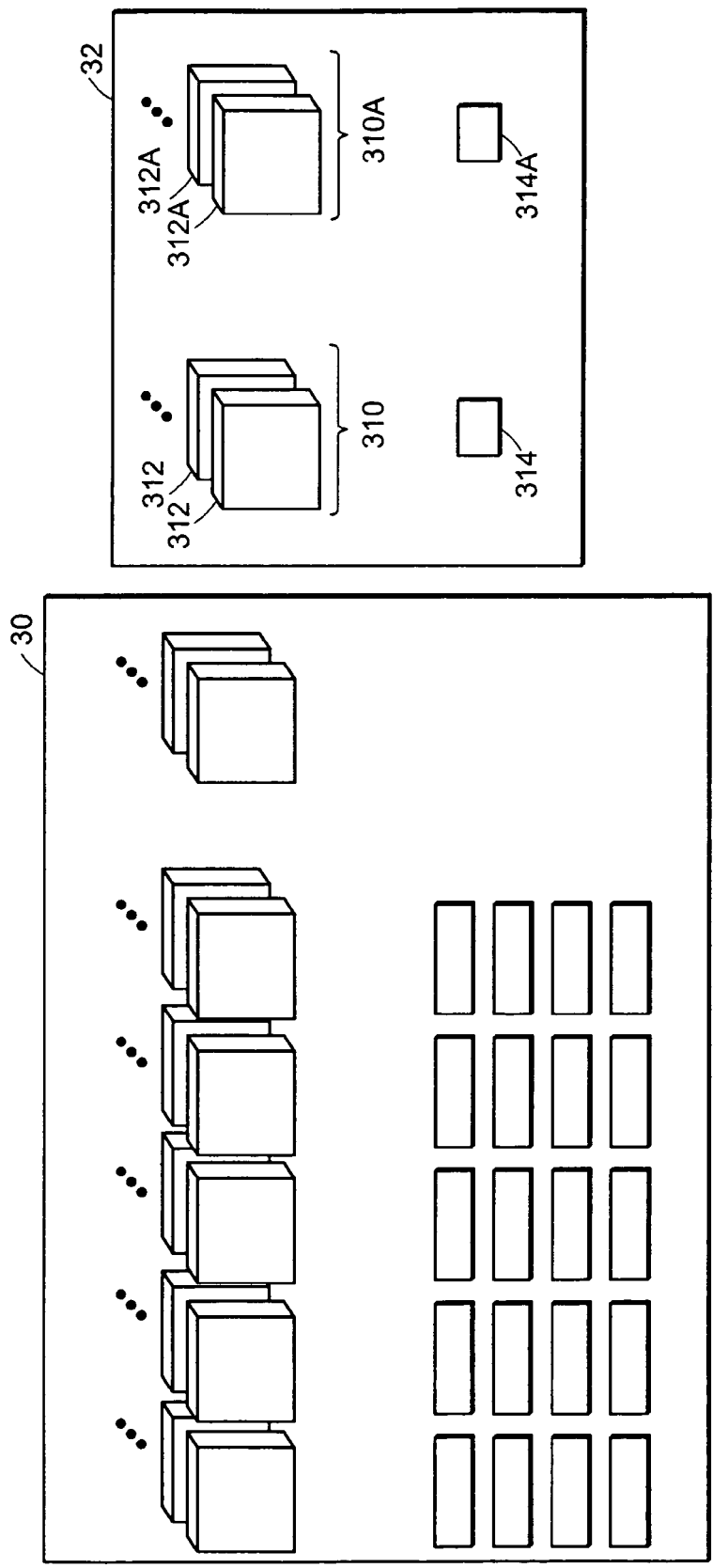

FIG. 8C corresponds with step 208 of FIG. 7. Here, a new partition 310A has been created in the high speed insert table. This new partition is sub-partitioned into sub-partitions 312A a single index 314A is created. High-speed inserts are now routed to this new partition 310A.

Figure 8D:
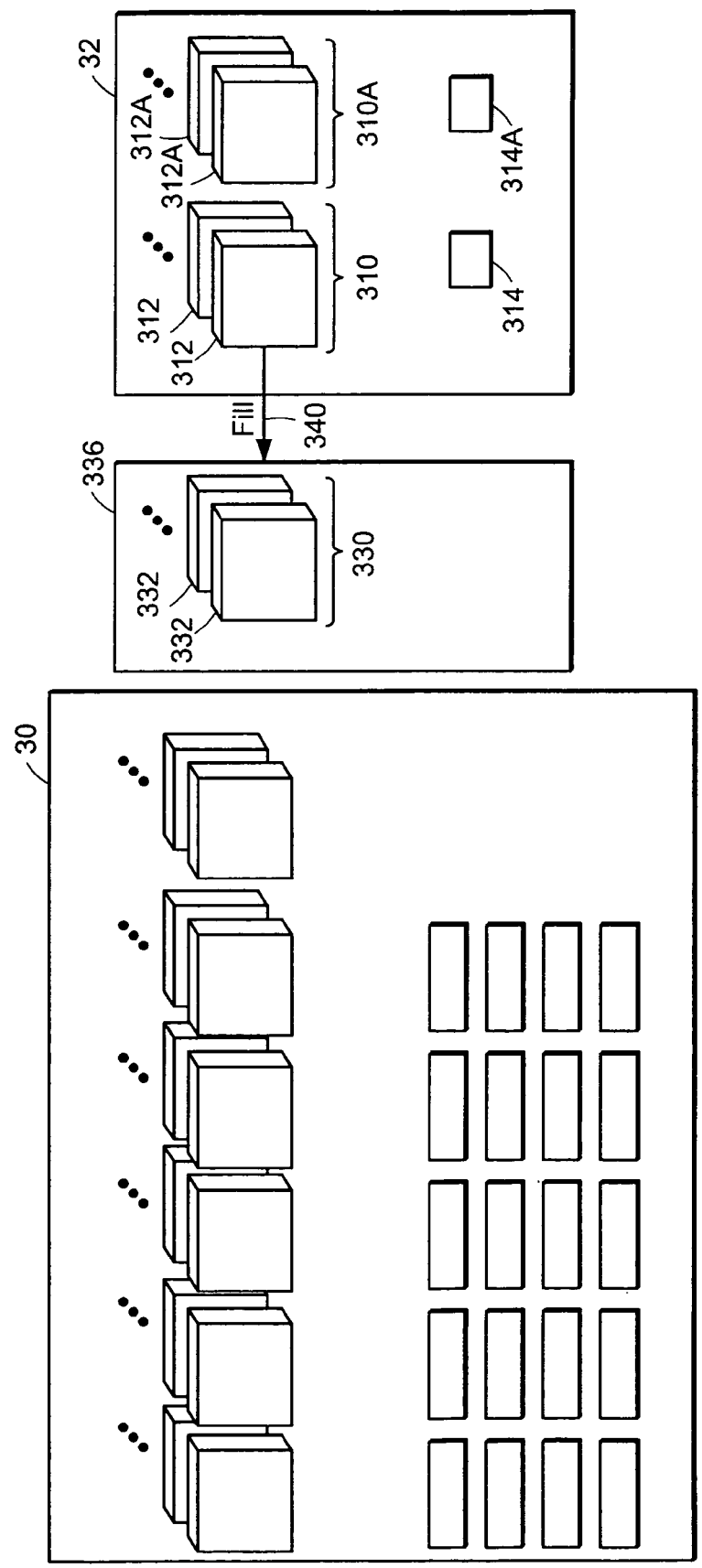

FIG. 8D illustrates step 210 of FIG. 7. A temporary table 336 is created comprising the table itself 330 and partitions 332. This new table is filled, according to fill operation 340, from the insert table 32.

Figure 8E:
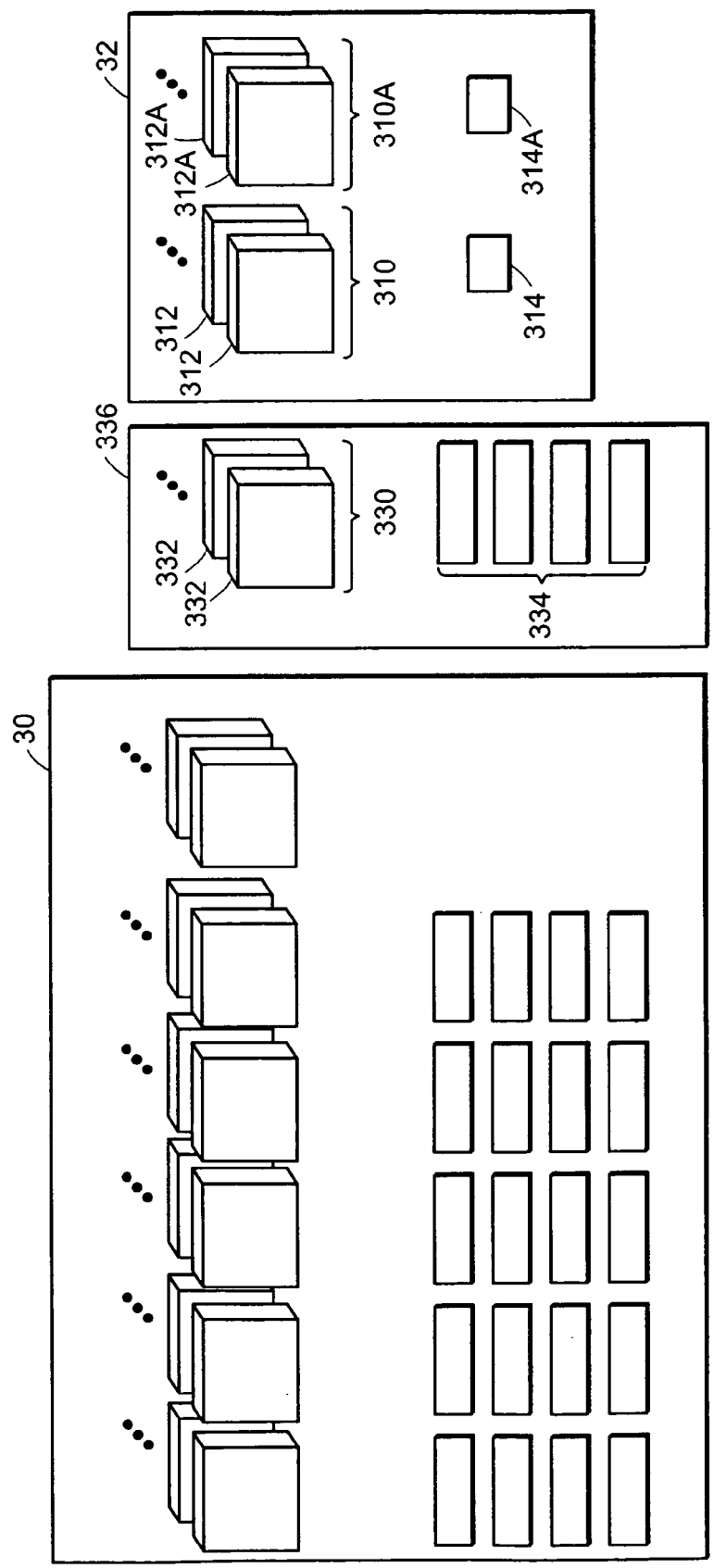

FIG. 8E corresponds with step 212 of FIG. 7. Here, new indexes 334 are created on the table 330.

Figure 8F:
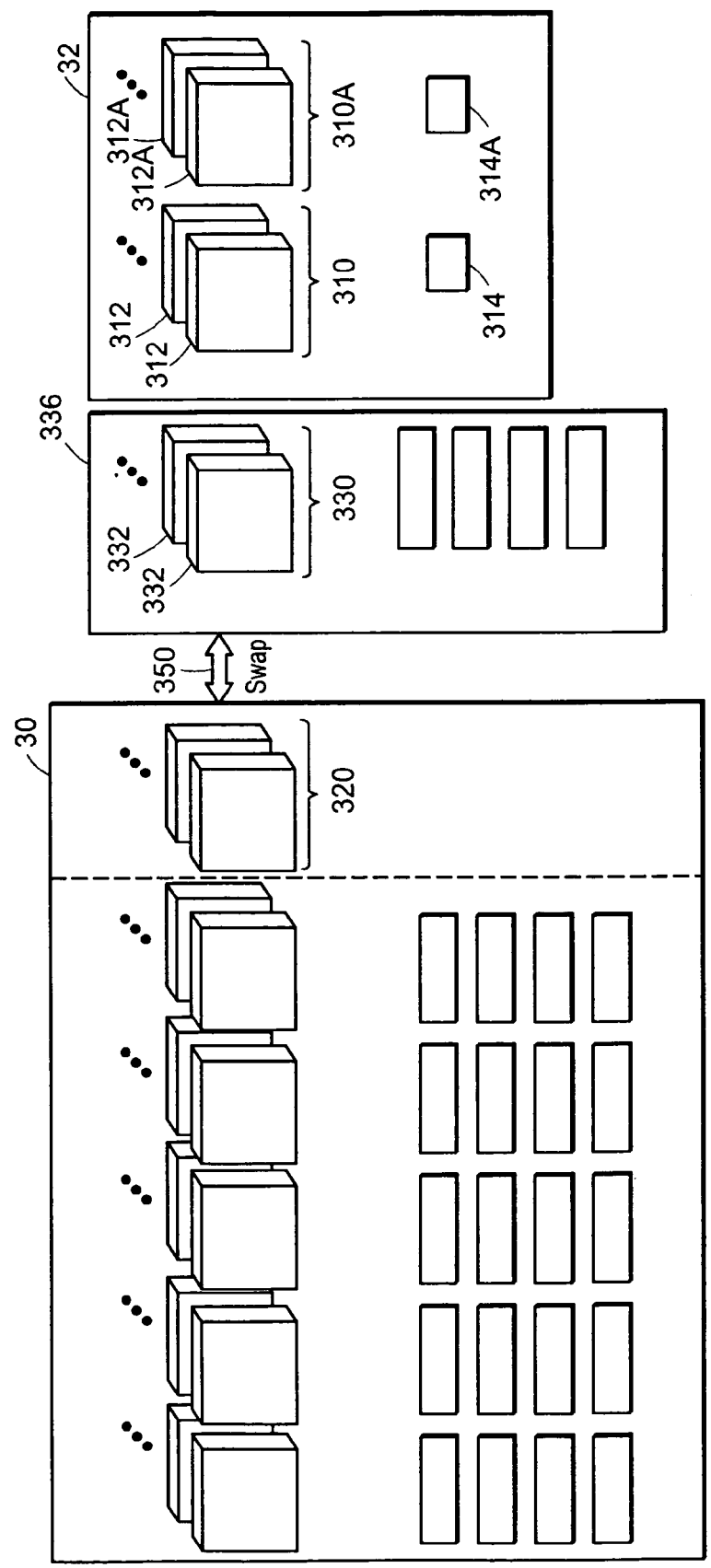

FIG. 8F corresponds with step 214 of FIG. 7. Here, the new partition 320 previously created in step 206, is swapped, by the swap operation 350, with the temporary table 336 created and filled in step 210. Such swapping is preferably performed by exchanging pointers only, thus reducing the overhead of an actual data transfer.

Figure 8G:
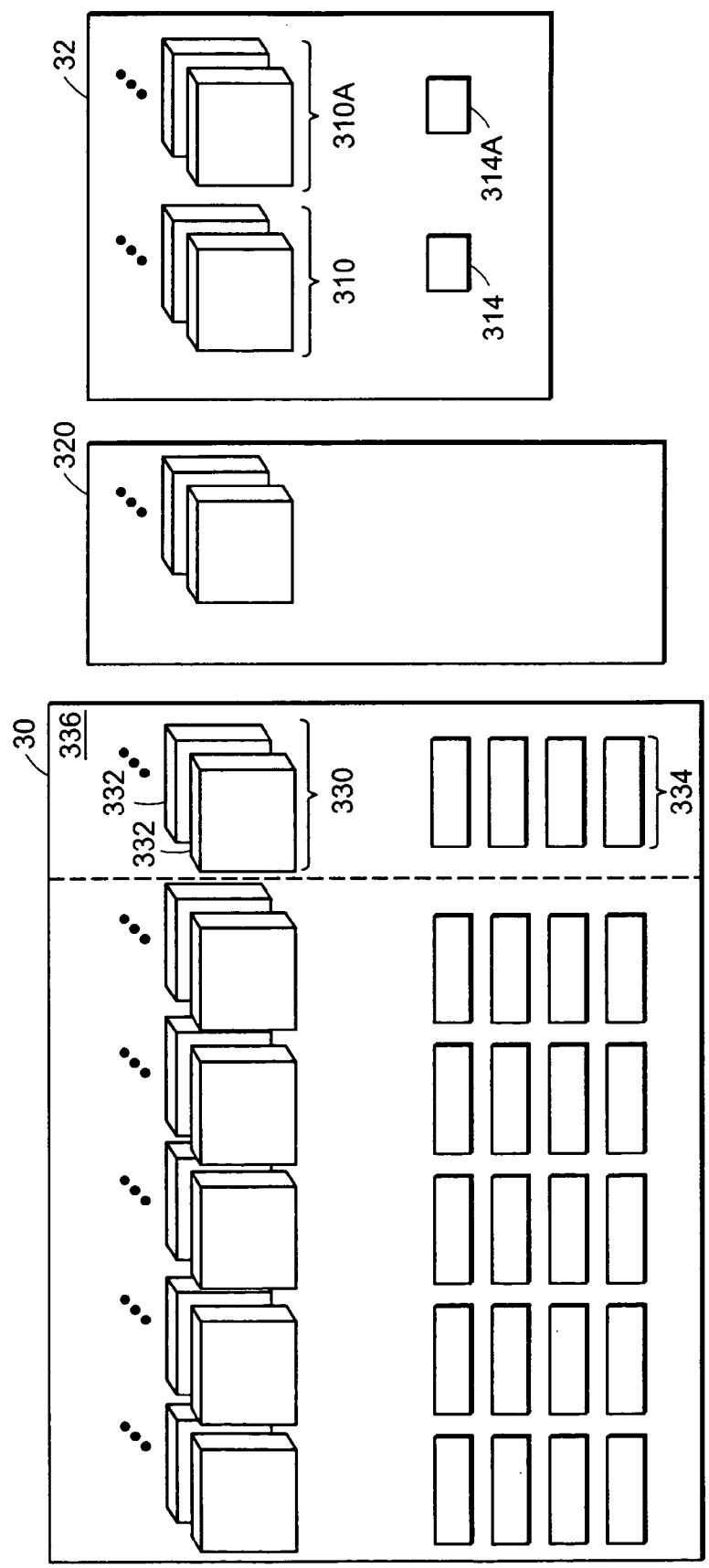

FIG. 8G shows the configuration after the swapping has been performed. Now, table 330 of FIG. 8F has been transformed to a partition 330 of the historical table 30, along with its accompanying indexes 334.

Figure 8H:
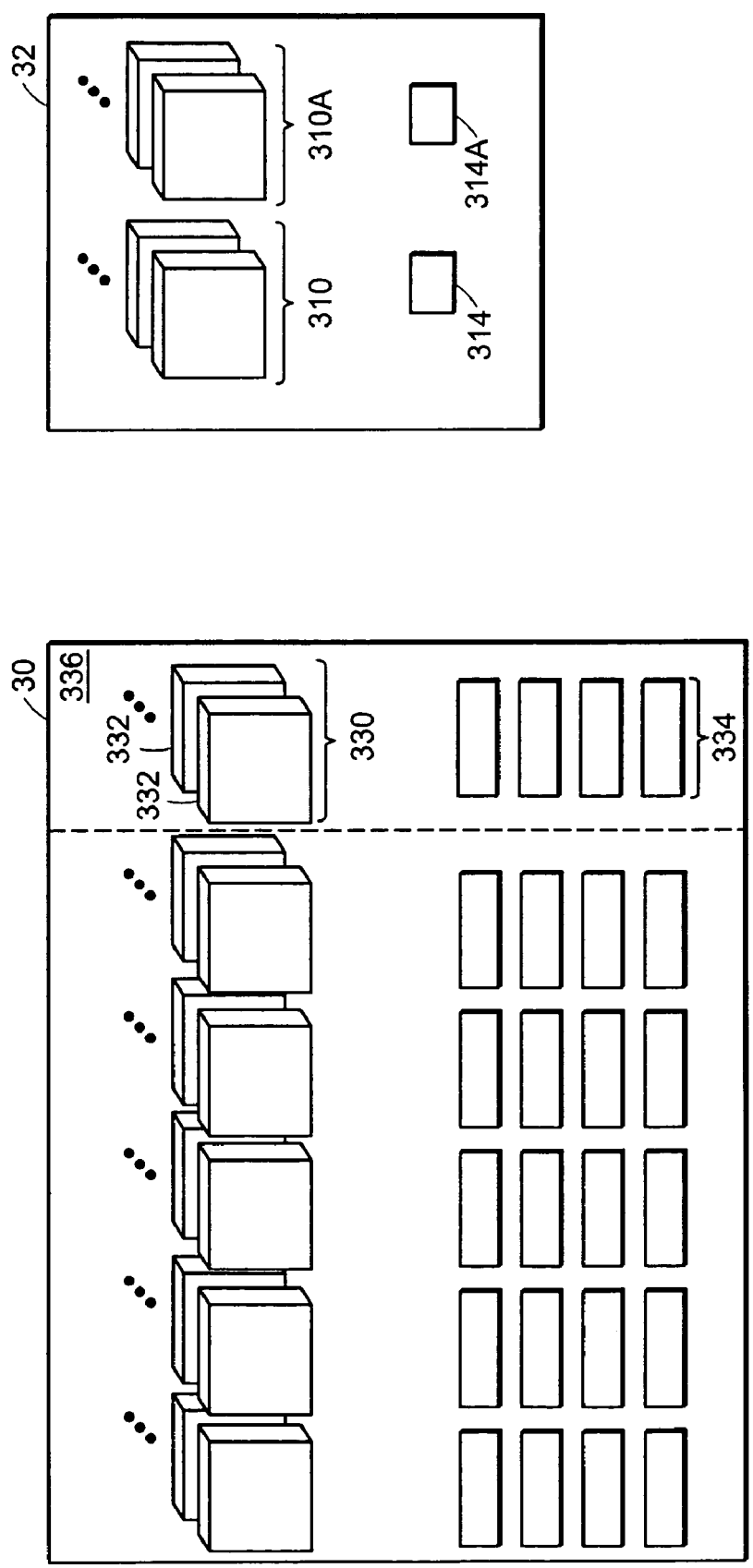

FIG. 8H corresponds with step 216 of FIG. 7, and shows that the temporary table has been dropped.

FIG. 8I corresponds with step 218 of FIG. 7. Here the old partition 32 of the high speed table has been dropped.

Reliability Through TruCluster Routing

The reliability of the ODS is dependent on the redundancy of hardware (processor nodes) and the rapid, automatic failover (and recovery) from one node on a Tru64 cluster to a "backup" node. The "backup" node may be in an inactive, "hot standby" capacity. Alternatively, all nodes may be available, each standing by for the other(s), while providing resources for scalability.

The failover of the ODS Wrapper requires cross-cluster routing of transactions and the application server having the capability to broker services between cluster nodes (and other integrated nodes) without intervention. The CORBA architecture provides a brokering service that locates available servers at the request of clients. However, the CORBA architecture does not guarantee the completion of "in flight" transactions should the back-end database server fail. Segregation of the database server from the CORBA (or other) EIA interface, and routing between these two components, provides a higher level of reliability for the ODS Wrapper, particularly "in flight" transactions. Transparent failover of the transactions underway is the goal of the routing component of the ODS wrapper.

For a high level of reliability, the database may be mounted cluster-wide and be accessible to all nodes on the cluster. The database may also be supported on RAID-based architectures to prevent database loss through storage hardware redundancy.

Those of ordinary skill in the art should recognize that methods involved in an operational data store may be embodied in a computer program product that includes a computer usable medium. For example, such a computer usable medium can include a readable memory device, such as a solid state memory device, a hard drive device, a CD-ROM, a DVD-ROM, or a computer diskette, having stored computer-readable program code segments. The computer readable medium can also include a communications or transmission medium, such as a bus or a communications link, either optical, wired, or wireless, carrying program code segments as digital or analog data signals.

While the system has been particularly shown and described with references to particular embodiments, it will be understood by those of ordinary skill in the art that various changes in form and details may be made without departing from the scope of the invention encompassed by the appended claims. For example, the methods of the invention can be applied to various environments, and are not limited to the described environment.

What is claimed is:

1. A method for operating an operational data store, comprising:
   creating a new partition in a composite-partitioned history table;
   creating a partitioned temporary table;
   filling the temporary table with data from an insert table;
   exchanging the temporary table with the new partition;
   receiving a query and applying the query to both the history table and the insert table; and
   throttling transactions of different classes independently to achieve a desired level of service.

2. The method of claim 1, further comprising:
   creating a new partition in the insert table based on values from an existing partition; and
   dropping the existing partition.

3. A non-transitory computer readable storage medium having computer readable code thereon that when executed cause a computer system to perform a method for operating an operational data store, said method comprising:
   creating a new partition in a composite-partitioned history table; creating a partitioned temporary table; filling the temporary table with data from an insert table; exchanging the temporary table with the new partition;
   receiving queries and applying said queries to both the history table and the insert table; and
   throttling transactions of different classes independently to achieve a desired level of service.

4. A computer system for producing a desired level of service in a mixed workload environment, comprising:
   a processor;
   a high-speed insert operational data store (ODS);
   a throttler for throttling selected transactions to the ODS and for throttling transactions of different classes independently to achieve a desired level of service; and
   an aggregator for accumulating transactions into batches and inserting each of the batches into the ODS using a single database transaction per batch.

5. The computer system of claim 4, wherein the mixed workload environment includes at least two of archiving, OLTP queries, DSS queries, high-speed inserts, backup processes and extract/translate/load transactions.

6. A method for producing a desired level of service in a mixed workload environment, comprising:
   inserting transactions into an operational data store (ODS) at a high-speed;
   throttling selected transactions to the ODS;
   throttling transactions of different classes independently to achieve a desired level of service;
   accumulating transactions into batches; and
   inserting each of the batches into the ODS using a single database transaction per batch.

7. The method of claim 6, wherein the mixed workload environment includes at least two of archiving, OLTP queries, DSS queries, high-speed inserts, backup processes and extract/translate/load transactions.

8. A computer system comprising an operational data store, wherein said computer system comprises:
   a processor;
   an insert table for storing new data;
   a history table for storing historical data, said history table comprises:
      a number of partitions, wherein each of said number of partitions is partitioned into a number of sub-partitions equal to the number of database server instances, and wherein said history table is partitioned into at least one of said number of partitions by a range; and
   transfer logic for periodically transferring new data from the insert table to the history table.

9. The computer system of claim 8, wherein each of said number of sub-partitions of each of said number of partitions is associated with said database server instance.

10. The computer system of claim 8, the transfer logic comprising:
    a secondary table;
    fill logic for filling the secondary table with selected data from the insert table; and
    secondary transfer logic for transferring the secondary table into the history table, the selected data thereby being transferred into the history table.

11. The computer system of claim 10, wherein the history table has an indexing scheme, the secondary transfer logic further comprising:
    indexing logic for applying the history table indexing scheme to the secondary table, wherein the indexing logic applies the history table indexing scheme to the secondary table prior to transferring the secondary table into the history table.

12. The computer system of claim 10, the secondary transfer logic further comprising:
    table logic for creating a new partition the history table, the new partition for swapping with the secondary table, wherein the secondary transfer logic swaps the secondary table and the new partition by exchanging respective pointers.

13. The computer system of claim 8, further comprising:
    a query engine for applying a database query to both the history table and the insert table.

14. The computer system of claim 8, further comprising:
    an aggregation buffer for accumulating new data; and
    an aggregator for batching the accumulated data and transferring the batched data into the insert table with a single database access.

15. The computer system of claim 14, wherein the aggregator transfers a batch of new data into the insert table when a batch size surpasses a maximum size, wherein the batch size is configurable.

16. The computer system of claim 15, wherein the batch size is measured according a group consisting of: a number data bytes and a number of records.

17. The computer system of claim 14, wherein the aggregator transfers batches of new data into the insert table at regular intervals, defined by a given period, wherein said period is configurable.

18. The computer system of claim 14, wherein the aggregator transfers batches of new data into the insert table when the aggregation buffer surpasses a given maximum buffer size, wherein the maximum buffer size is configurable.

19. A computer system comprising an operational data store, wherein said computer system comprising:
    a processor;
    an insert table for storing new data;
    a history table for storing historical data;

transfer logic for periodically transferring new data from the insert table to the history table; and a throttler for throttling transactions of different classes independently to achieve a desired level of service.

20. The computer system of claim 19, wherein a first transaction class is a query, and a second transaction class is an insert, the throttler throttling queries so that inserts are executed at at least the desired level of service.

21. The computer system of claim 19, wherein at least one transaction class comprises plural transaction types, the throttler throttling transactions of different types independently.

22. The computer system of claim 19, further comprising:
a plurality of processor nodes configured as a processor cluster, wherein distinct database server instances are associated with distinct processor nodes of the processor cluster.

23. The computer system of claim 22, wherein the history table is partitioned, each partition is further sub-partitioned into a number of sub-partitions, and the number of sub-partitions is equal to the number of database server instances.

24. The computer system of claim 19, wherein data from the insert table is transferred to the history table at regular intervals, wherein the intervals are selected from the group consisting of: configurable intervals and different intervals for different tables.

25. A method for maintaining an operational data store, comprising:
inserting new data into an insert table;
partitioning the history table into a number of partitions according to a range;
partitioning each of said number of partitions into a number of sub-partitions equal to a number of database server instances, and
periodically transferring data from the insert table to a history table.

26. The method of claim 25, further comprising:
associating each said number of sub-partitions of each said number of said partitions with the database server instance.

27. The method of claim 25, further comprising:
creating a secondary table;
filling the secondary table with selected data from the insert table; and
transferring the secondary table into the history table, the selected data thereby being transferred into the history table.

28. The method of claim 27, wherein the history table has an indexing scheme, the method further comprising:
applying the history table indexing scheme to the secondary table, wherein the history table indexing scheme is applied to the secondary table prior to transferring the secondary table into the history table.

29. The method of claim 27, further comprising:
creating a new partition in the history table, wherein the secondary table is transferred by being swapped with the new partition, wherein the secondary table and new partition are swapped by exchanging respective pointers.

30. The method of claim 25, further comprising:
applying a database query to both the history table and the insert table.

31. The method of claim 25, further comprising:
aggregating new data into batches; and
inserting the batched new data into the insert table with a single database access.

32. The method of claim 31, wherein a batch of new data is transferred into the insert table when a batch surpasses a maximum size, wherein the maximum size is configurable.

33. The method of claim 32, wherein batch size is measured according to a group consisting of: a number data bytes and a number of records.

34. The method of claim 31, wherein batches of new data are transferred into the insert table at regular intervals, defined by a given configurable period.

35. The method of claim 31, further comprising:
aggregating the batches of new data in an aggregation buffer, wherein the batches are transferred into the insert table when the aggregation buffer surpasses a given configurable maximum buffer size.

36. A method for maintaining an operational data store, comprising:
inserting new data into an insert table;
periodically transferring data from the insert table to a history table; and
throttling transactions of different classes independently to achieve a desired level of service.

37. The method of claim 36, wherein a first transaction query is a query, and a second transaction class is an insert, and queries are throttled so that new data is inserted at at least the desired level of service.

38. The method of claim 36, wherein at least one transaction class comprises plural transaction types which are independently throttled.

39. The method of claim 36, further comprising:
configuring plural processor nodes as a processor cluster; and
executing distinct database server instances on distinct processor nodes of the processor cluster.

40. The method of claim 39, further comprising:
partitioning the history table; and
sub-partitioning each partition into a number of sub-partitions, wherein the number of sub-partitions is equal to the number of database server instances.

41. A non-transitory computer readable storage medium having computer readable code thereon that when executed cause a computer system to perform a method for operating an operational data store, said method comprising:
inserting new data into an insert table;
periodically transferring data from the insert table to a history table;
applying a database query to both the history table and the insert table; and
throttling transactions of different types independently to achieve a desired level of service.

42. The tangible computer readable storage medium program product of claim 41, further comprising:
batching new data; and
inserting the batched new data into the insert table with a single database access.

* * * * *

UNITED STATES PATENT AND TRADEMARK OFFICE
CERTIFICATE OF CORRECTION

PATENT NO. : 8,090,751 B2
APPLICATION NO. : 10/068466
DATED : January 3, 2012
INVENTOR(S) : Sally Elaine Saffer et al.

It is certified that error appears in the above-identified patent and that said Letters Patent is hereby corrected as shown below:

In the Claims:

In column 12, line 35, in Claim 12, delete "partition" and insert -- partition in --, therefor.

In column 12, line 53, in Claim 16, delete "according" and insert -- according to --, therefor.

In column 12, line 53, in Claim 16, delete "number" and insert -- number of --, therefor.

In column 12, line 64, in Claim 19, delete "comprising:" and insert -- comprises: --, therefor.

In column 14, line 9, in Claim 33, delete "number" and insert -- number of --, therefor.

In column 14, line 54, in Claim 42, delete "tangible" and insert -- non-transitory --, therefor.

Signed and Sealed this
Eighth Day of October, 2013

Teresa Stanek Rea
*Deputy Director of the United States Patent and Trademark Office*